(12) United States Patent
Sugino

(10) Patent No.: US 7,238,899 B2
(45) Date of Patent: Jul. 3, 2007

(54) IN-VEHICLE KNOB SWITCH DEVICE

(75) Inventor: Naoki Sugino, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/520,141

(22) Filed: Sep. 12, 2006

(65) Prior Publication Data

US 2007/0062792 A1  Mar. 22, 2007

(30) Foreign Application Priority Data

Sep. 16, 2005 (JP) .............................. 2005-270499

(51) Int. Cl.
*H01H 9/00* (2006.01)
(52) U.S. Cl. .................................. 200/61.54
(58) Field of Classification Search ................ 200/5 R, 200/17 R, 18, 61.54, 61.85, 293.1, 332.2, 200/341
See application file for complete search history.

(56) References Cited

U.S. PATENT DOCUMENTS

| | | | |
|---|---|---|---|
| 5,610,378 A | * | 3/1997 | DuRocher et al. ....... 200/61.54 |
| 5,854,458 A | * | 12/1998 | Ramamurthy et al. ... 200/61.54 |
| 5,905,237 A | | 5/1999 | Hayakawa et al. |
| 5,939,686 A | * | 8/1999 | Bellach et al. ............ 200/61.54 |
| 6,091,033 A | * | 7/2000 | Kato ........................ 200/61.54 |
| 6,365,852 B1 | * | 4/2002 | Leng et al. .............. 200/61.54 |
| 6,791,042 B2 | * | 9/2004 | Nakade et al. ........... 200/61.54 |
| 6,849,815 B2 | * | 2/2005 | Leng ....................... 200/61.54 |
| 6,900,404 B2 | * | 5/2005 | Searle et al. ................ 200/341 |

* cited by examiner

*Primary Examiner*—Michael A Friedhofer
(74) *Attorney, Agent, or Firm*—Brinks Hofer Gilson & Lione

(57) ABSTRACT

An in-vehicle knob switch device is provided. The in-vehicle know switch device includes a tubular housing having an opening and defined by a casing and a cover. A holder is disposed inside the housing. A circuit board is disposed on the holder. A first push switch is mounted on the circuit board. An operating knob is exposed through the opening of the housing and provided for pushing the first push switch.

5 Claims, 6 Drawing Sheets

IN-VEHICLE KNOB SWITCH DEVICE

This application claims the benefit of Japanese Patent Application No. 2005-270499 filed on Sep. 16, 2005, which is hereby incorporated by reference.

BACKGROUND

1. Field

The present embodiments relate to in-vehicle knob switch device, which is also known as a stalk switch. In particular, the present embodiments relate to an in-vehicle knob switch device having a pushable operating knob disposed on an outer periphery surface of a tubular housing.

2. Related Art

In a typical vehicle, an in-vehicle knob switch device, known as a stalk switch, is disposed near a steering column and is provided for controlling, for example, wipers and headlights. An in-vehicle knob switch device generally includes, for example, a tubular housing tiltably supported by the steering column. An operating knob is exposed through an opening provided in an outer periphery surface of the housing. A holder is fixed inside the housing. A circuit board is supported by the holder. The circuit board has, for example, a push switch disposed thereon, which is actuated when the operating knob is pushed. A user can tilt the housing or push the operating knob to turn a wiper device on or off, to adjust the intensity level of the wiper device, to change intermittent modes of the wiper device, to turn the headlights on or off, or to change beam modes of the headlights.

As a known example of such an in-vehicle knob switch device, Japanese Unexamined Patent Application Publication No. 10-269898 (pages 3 and 4, FIGS. 1 and 2) discloses a device having a housing that has a guide member disposed therein, which supports the operating knob in a vertically movable fashion. The guide member is combined with the holder using fixing means of, for example, a snap-fit type, and the push switch mounted on the circuit board is embraced by the guide member. The guide member is provided with a cylindrical guide portion at a position facing the push switch. A columnar boss protruding from an undersurface of the operating knob is slidably engaged with the guide portion so that the operating knob can be pushed smoothly.

In an in-vehicle knob switch device of this type, if an internal space of the housing is dimensionally reduced due to, for example, limitations in design, it is difficult to attain a space for setting the guide member mentioned in the above-reference conventional example. Therefore, the guide member has to be omitted, which implies that the operating knob must be guided with the housing itself. In that case, a guide portion extending inward towards the surface of the circuit board may be provided around the opening of the housing, and the guide portion may serve as a slide surface for guiding the operating knob vertically. Because the housing has disposed therein the holder that supports the circuit board, the maximum permissible length of the guide portion is limited to within a distance between the opening and the holder. This may be problematic in that a large backlash may occur in the operating knob during a pushing operation.

SUMMARY

One exemplary object of the present embodiments is to provide an in-vehicle knob switch device that allows for a smooth pushing operation of an operating knob without backlash.

An in-vehicle knob switch device according to the present embodiment includes a tubular housing having an opening. A holder is disposed inside the housing. A circuit board is supported by the holder. A push switch is mounted on the circuit board. An operating knob is exposed through the opening and is capable of pushing the push switch. Opposite side surfaces of the holder are provided with cutout-like recesses, the recesses being provided in a section of the holder that faces the opening. The housing is provided with guide portions that extend through the recesses from the opening. The operating knob is provided with a plurality of slidable portions that protrude into the housing so as to sandwich the holder, the slidable portions being slidably engaged with the guide portions.

According to the present embodiment, since the guide portions for guiding the operating knob in response to a pushing operation are provided in the housing, and the guide portions are positioned within the cutout-like recesses provided in the holder, the guide portions are given a sufficient length so as to extend from the opening to the sides of the holder. Accordingly, a backlash that may occur in the operating knob during a pushing operation is significantly reduced.

Although the engagement relationship between the slidable portions of the operating knob and the guide portions of the housing is not specifically limited, the slidable portions are preferably defined by leg segments disposed at four corners of an undersurface of the operating knob, the leg segments being slidably engaged with grooves provided in the guide portions.

According to the present embodiment, the opposite side surfaces of the holder disposed inside the housing are provided with cutout-like recesses in a section of the holder that faces the opening, and the guide portions provided in the housing are positioned within the recesses. The guide portions are given a sufficient length so as to extend from the opening of the housing to the sides of the holder. Accordingly, the guide portions allow for a smooth pushing operation of the operating knob without backlash.

DESCRIPTION OF THE PREFERRED EMBODIMENTS

Figure 1:
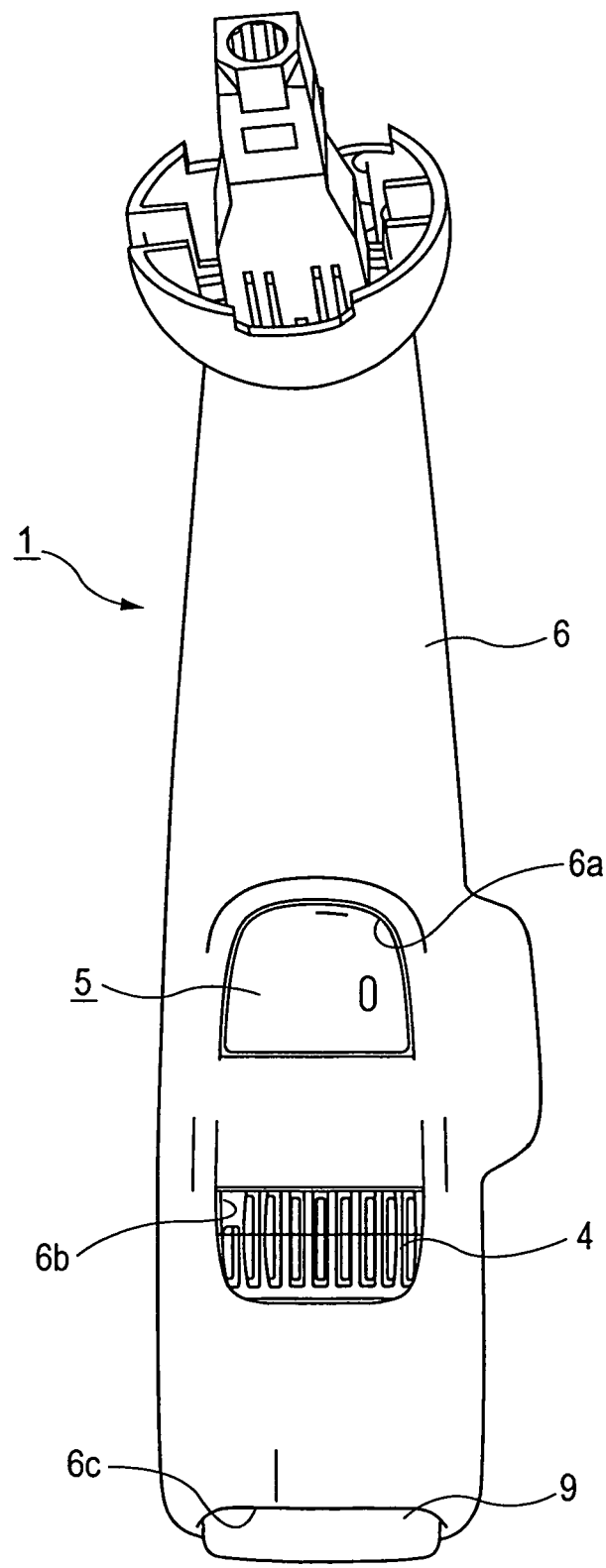
FIG. 1 is a plan view of an in-vehicle knob switch device according to an exemplary embodiment.

With reference to the drawings, the in-vehicle knob switch device according to one exemplary embodiment includes, a tubular housing 1 constituting a portion of a combination switch unit. A holder 2 is disposed inside the housing 1. A circuit board 3 is disposed on the holder 2. An operating ring 4 is rotatably supported by the holder 2. An operating knob 5 is supported by the housing 1 in a vertically movable fashion.

The housing 1 includes a synthetic-resin casing 6 whose lower side is provided with an opening, and a synthetic-resin cover 7 which covers the lower opening of the casing 6. The casing 6 and the cover 7 are joined to each other in a snap-fit fashion. The casing 6 is also provided with an opening 6a on an outer surface thereof. The operating knob 5 has an operating surface 5a that is exposed through the opening 6a. The operating knob 5 also has four slidable leg segments 5b and one retaining segment 5c, which protrude into the casing 6 from the underside of the operating surface 5a.

Figure 4:
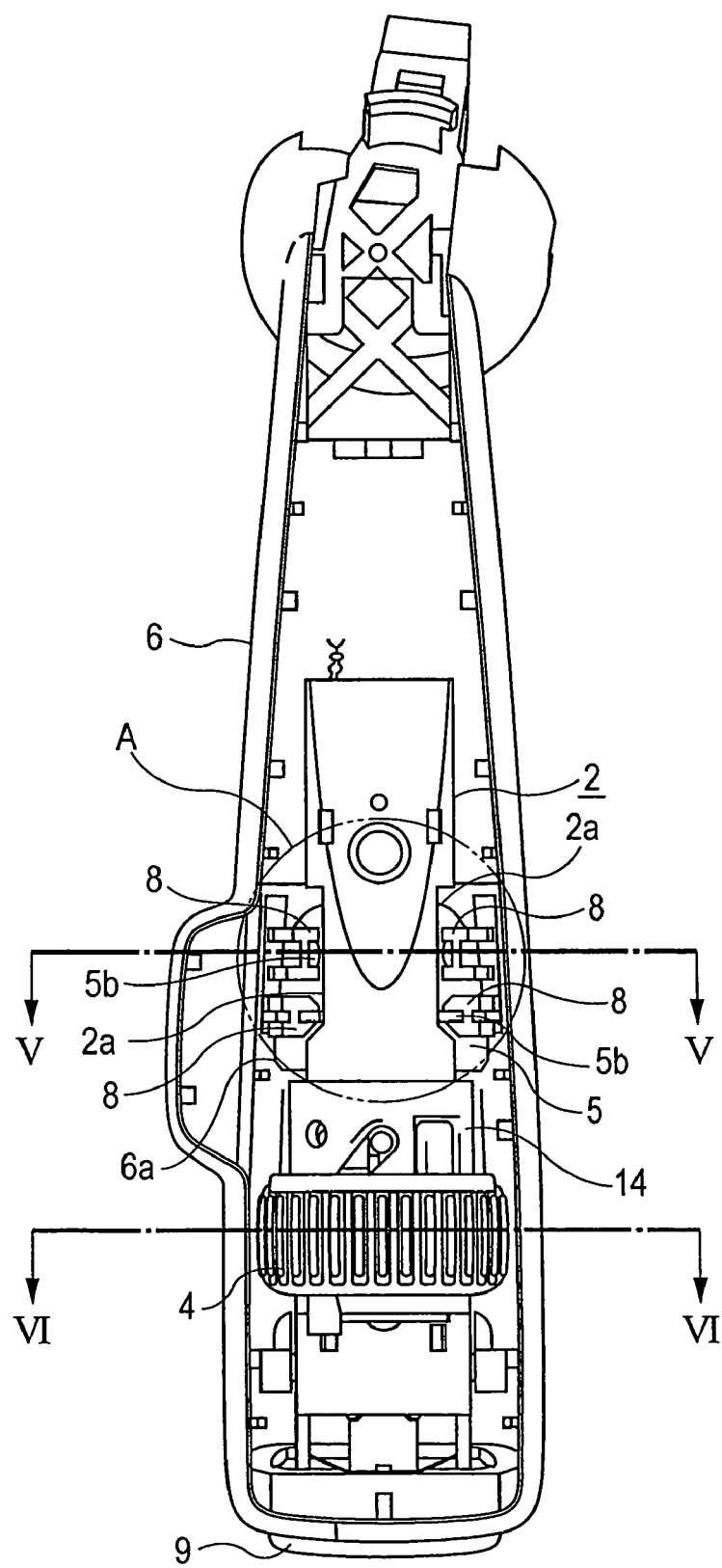
FIG. 4 is a bottom view showing an internal structure of the in-vehicle knob switch device.
Figure 7:
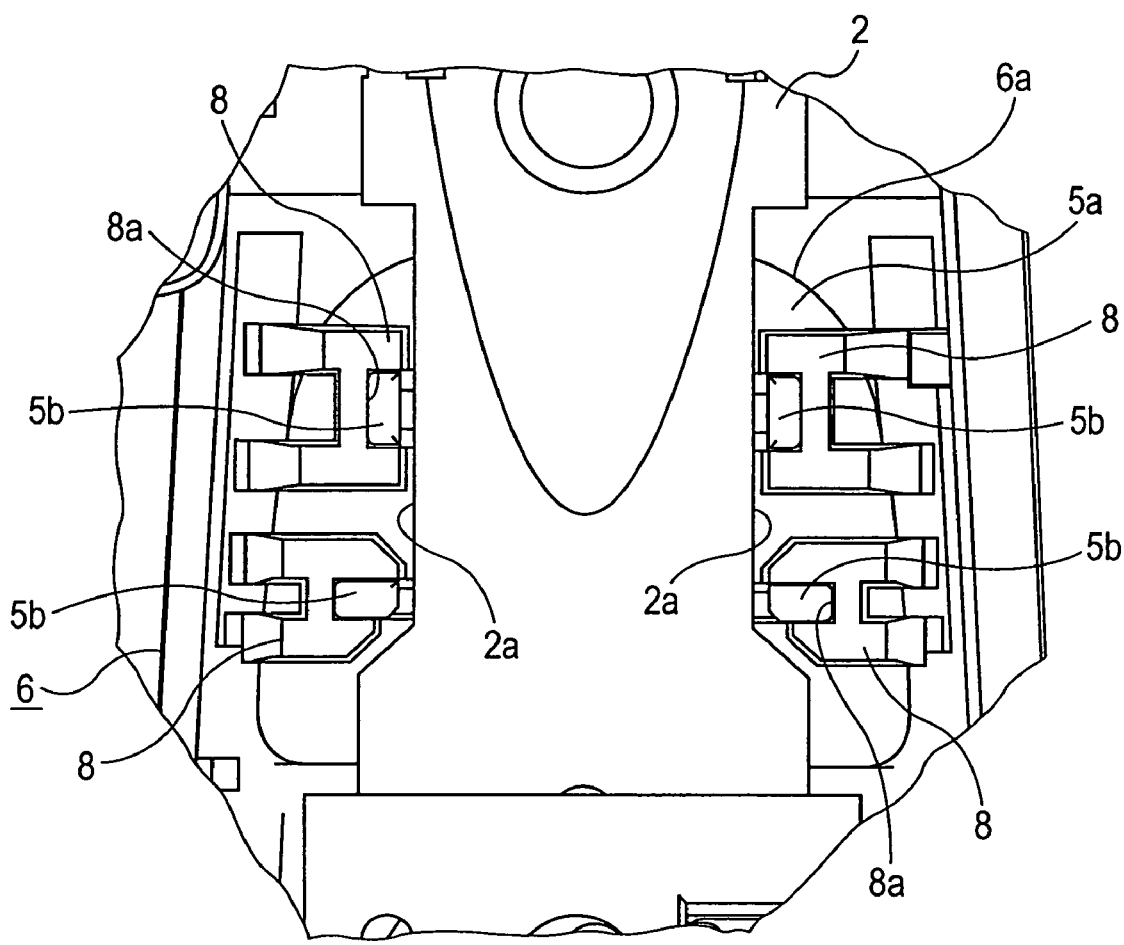
FIG. 7 is a detail view of section A in FIG. 4.

The operating surface 5a, the slidable leg segments 5b, and the retaining segment 5c are formed integrally using synthetic resin. The slidable leg segments 5b extend linearly from four corners of the underside of the operating surface 5a. The retaining segment 5c extends from a position between two of the slidable leg segments 5b that face each other. Referring to FIGS. 4 and 7, inner opposing surfaces of the casing 6 are each integrally provided with guide portions, for example, two guide walls 8, which means that there are a total of four guide walls 8 provided. The four guide walls 8 extend linearly respectively from four corners of the opening 6a towards the interior of the casing 6. Each guide wall 8 is provided with a groove 8a that extends in the longitudinal direction thereof.

The four slidable leg segments 5b of the operating knob 5 slidably engage with the four corresponding grooves 8a, for example, respectively, such that the operating knob 5 is supported by the casing 6 in a vertically movable fashion. The outer surface of the casing 6 is provided with another opening 6b, which faces an opening 7a provided on an outer surface of the cover 7. The operating ring 4 is partly exposed through these openings 6b, 7a. The casing 6 is provided with a through hole 6c at a front end thereof. A key top 9 penetratingly supported by the holder 2 protrudes outward from the front end of the casing 6 through the through hole 6c.

The holder 2 has an elongate synthetic-resin body that extends through an internal space of the housing 1 (i.e. the casing 6 and the cover 7). The holder 2 is fixed to a ceiling surface of the casing 6 with a screw 10. In a section of the holder 2 that faces the opening 6a of the casing 6, the opposite side surfaces of the holder 2 are provided with cutout-like recesses 2a. Consequently, where the recesses 2a are provided, the width of the holder 2 is made narrower. As shown in FIGS. 4 and 7, the guide walls 8 of the casing 6 extend through the recesses 2a toward lower sides of the holder 2. The slidable leg segments 5b of the operating knob 5 sandwich the holder 2 while being engaged with the corresponding grooves 8a of the guide walls 8 within the recesses 2a.

A slider 11 having a sliding segment (not shown) is supported by the holder 2 in a longitudinally movable fashion. The slider 11 is provided with a pendulous segment 11a that extends to the exterior of the holder 2 through a long hole 2b provided in a lower section of the holder 2. The holder 2 has a semi-cylindrical portion 2c that surrounds the slider 11. The semi-cylindrical portion 2c supports a ball 13 via a spring 12. The semi-cylindrical portion 2c also supports a cylindrical driving member 14 in a rotatable fashion.

The operating ring 4 is fitted around the driving member 14, by which the two are combined with each other. The periphery surface of the cylindrical driving member 14 is provided with a click hole 14a and a helical slit 14b. The click hole 14a faces the ball 13 in an engageable fashion, and the helical slit 14b is engaged with the pendulous segment 11a of the slider 11. Accordingly, when the operating ring 4 is rotated with respect to the housing 1, a rotational force of the driving member 14 rotating in conjunction with the operating ring 4 is converted to a linear motion of the slider 11, and the ball 13 becomes engaged to or disengaged from the click hole 14a in response to the rotation of the driving member 14, thereby generating a click.

Figure 2:
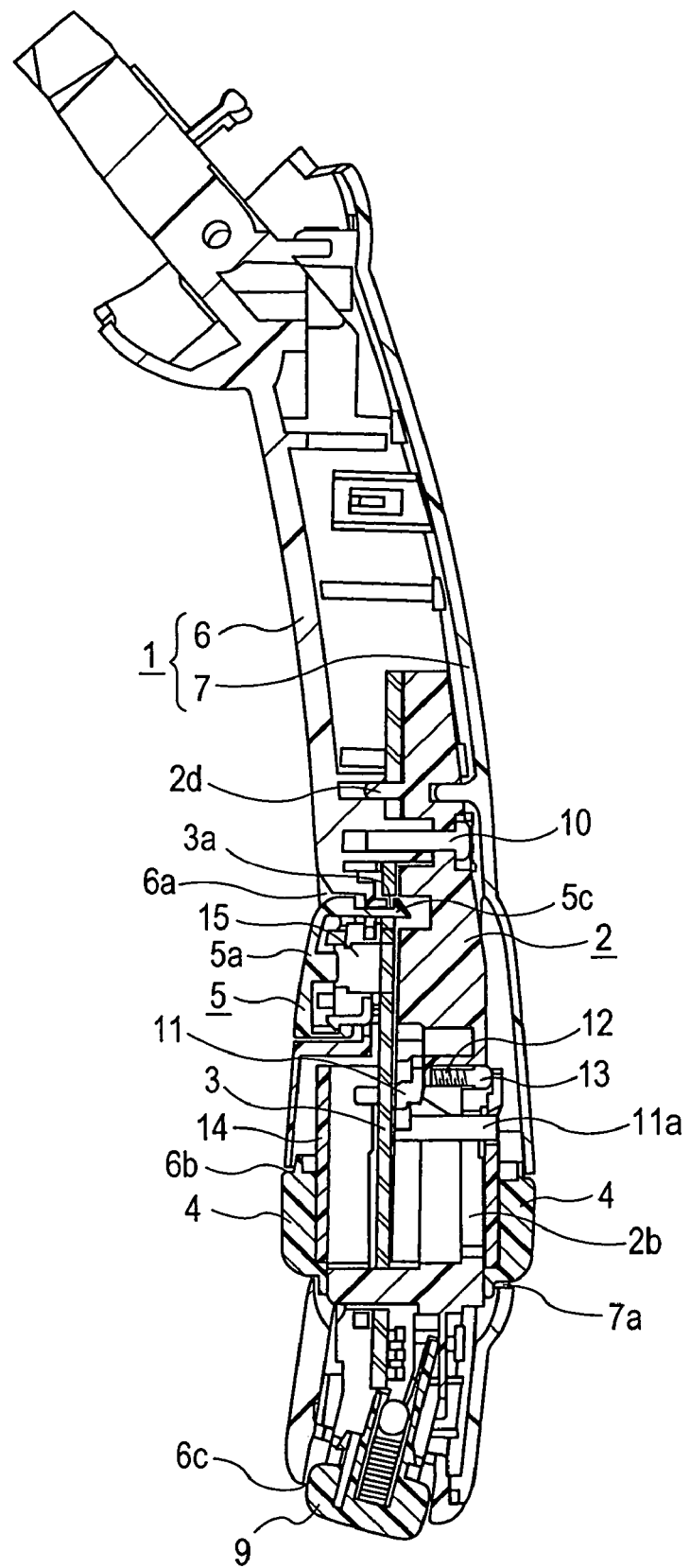
FIG. 2 is a cross-sectional view of the in-vehicle knob switch device.
Figure 3:
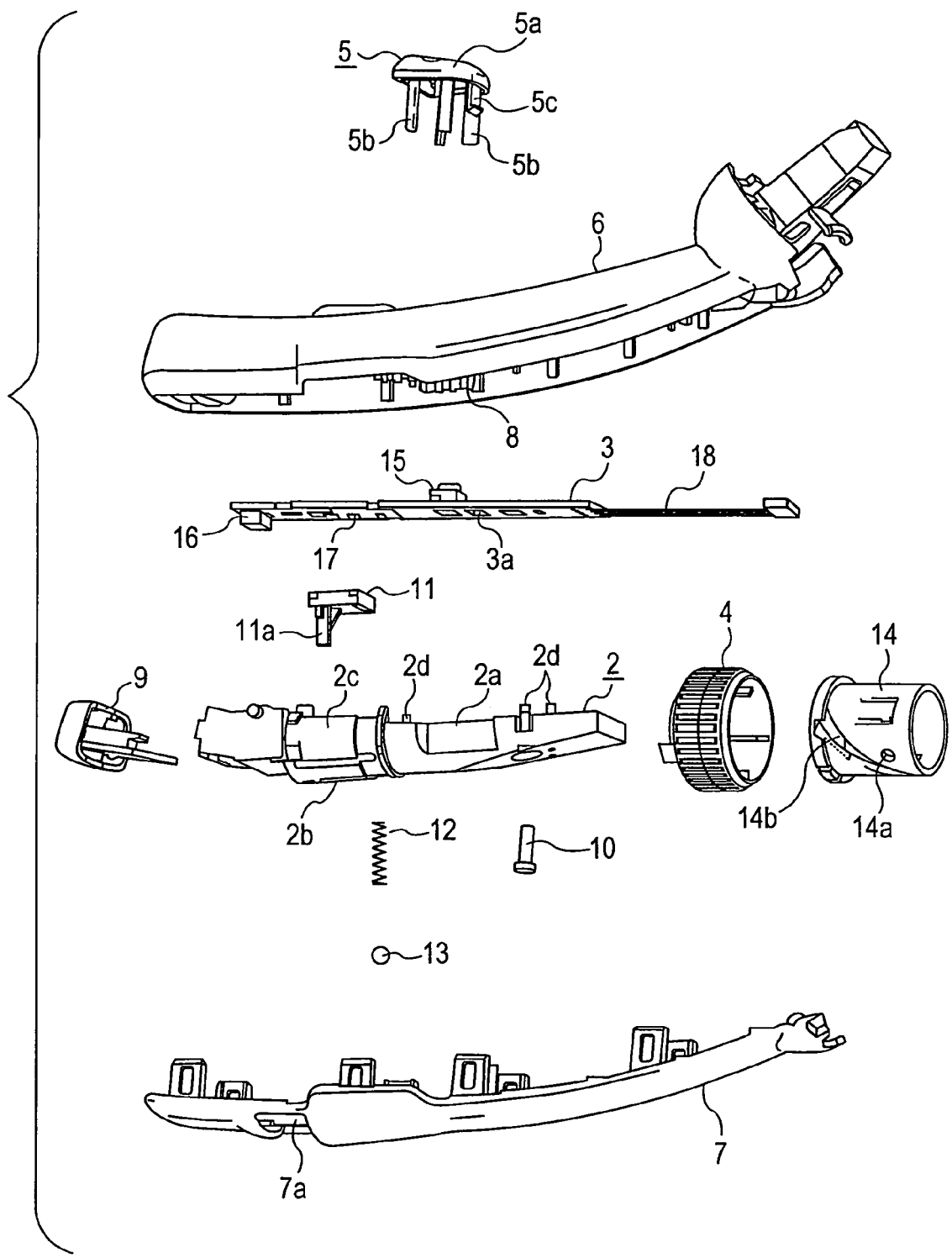
FIG. 3 is an exploded perspective view of the in-vehicle knob switch device.

The circuit board 3 is securely disposed on the upper surface of the holder 2. While extending through the operating ring 4 and the driving member 14, the circuit board 3 is positioned on the holder 2 with a plurality of projections 2d. The circuit board 3 has a first push switch 15 mounted on an upper surface thereof. Referring to FIG. 2, a stem of the first push switch 15 is in contact with the underside of the operating surface 5a of the operating knob 5. A section of the circuit board 3 near the first push switch 15 is provided with a locking hole 3a. A lower end of the retaining segment 5c of the operating knob 5 is locked to an edge of the locking hole 3a so that the operating knob 5 is prevented from coming off the casing 6. Alternatively, the lower surface of the circuit board 3 has a second push switch 16 mounted thereon, which is actuated with the key top 9.

Figure 5:
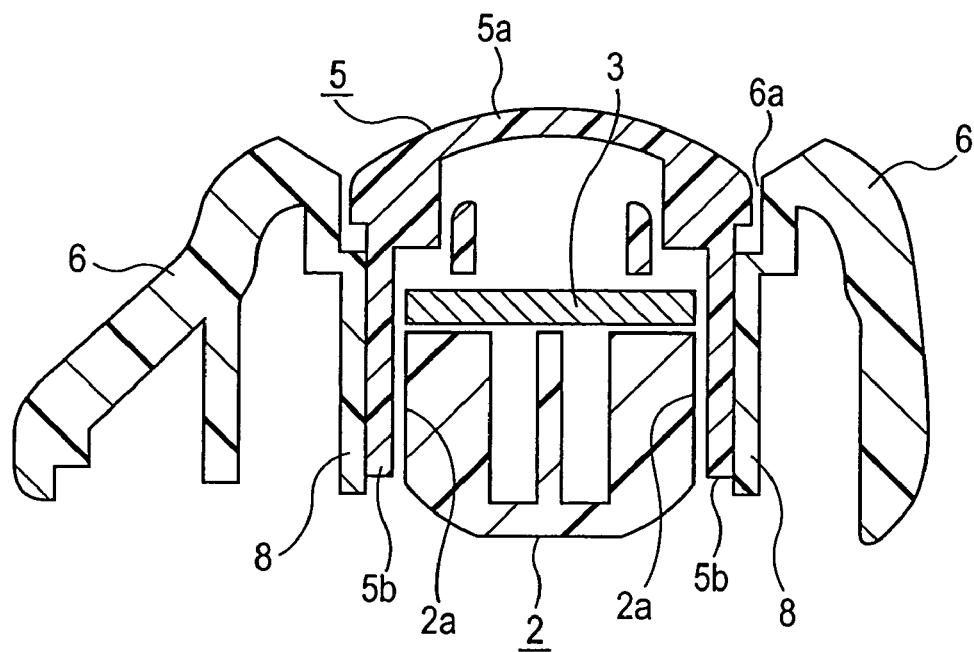
FIG. 5 is a cross-sectional view taken along line V—V in FIG. 4.
Figure 6:
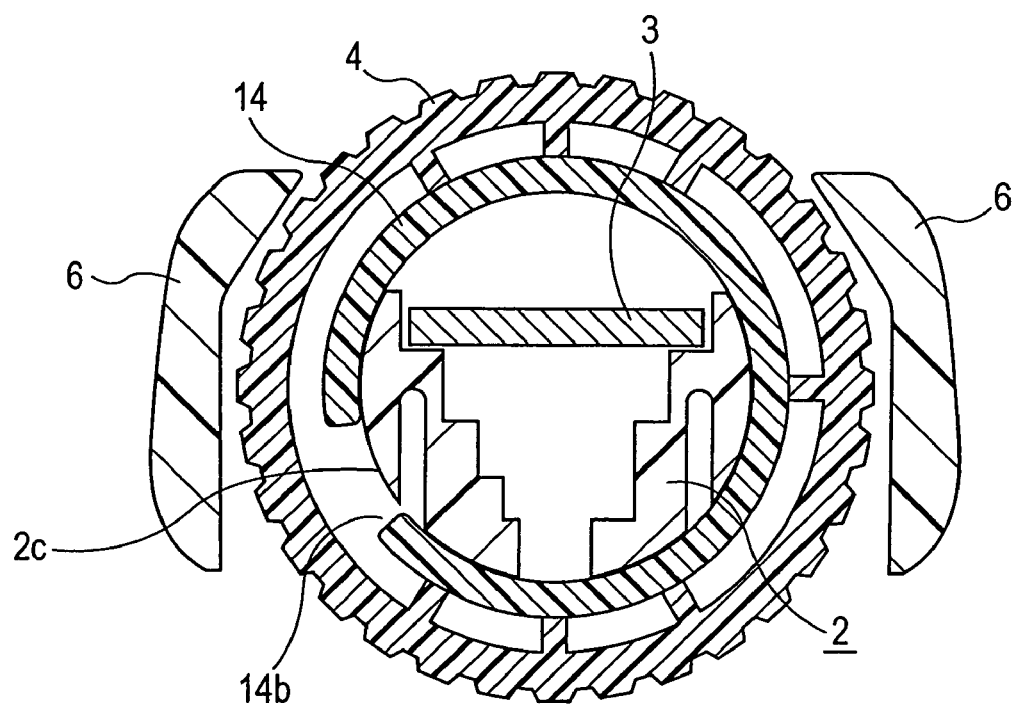
FIG. 6 is a cross-sectional view taken along line VI—VI in FIG. 4.

The lower surface of the circuit board 3 also has a fixed contact 17 patterned thereon. The fixed contact 17 is capable of coming into and out of contact with the sliding segment (not shown) of the slider 11. Thus, the sliding segment and the fixed contact 17 constitute a slide switch. The circuit board 3 has an elongate shape that is smaller than the planar shape of the holder 2. Specifically, as shown in FIG. 5, the section of the holder 2 where the recesses 2a are provided has substantially the same width as the circuit board 3, but, as shown in FIG. 6, the section of the holder 2 where the semi-cylindrical portion 2c is provided is larger in width than the circuit board 3. One end of the circuit board 3 is connected to a flexible printed board 18. Through this flexible printed board 18, signals output from the first and second push switches 15, 16 and the fixed contact 17 are lead outward from the housing 1.

In the present embodiment, when a user rotates the operating ring 4 exposed through the openings 6b, 7a in the housing 1, the driving member 14 combined with the operating ring 4 rotates conjunctionally so as to allow the ball 13 to become engaged to or disengaged from the click hole 14a in the driving member 14. This generates a click. The rotational force of the driving member 14 is converted to a linear motion of the slider 11 at the engagement section between the helical slit 14b and the pendulous segment 11a, thus allowing the sliding segment (not shown) of the slider 11 to slide onto the fixed contact 17 disposed on the lower surface of the circuit board 3. An electric signal corresponding to the rotational amount of the operating ring 4 is output from the slide switch defined by the sliding segment and the fixed contact 17, and is lead outward from the circuit board 3 via the flexible printed board 18.

Alternatively, when the user pushes the operating surface 5a of the operating knob 5, which is exposed through the opening 6a in the housing 1, the slidable leg segments 5b of the operating knob 5 move downward while being guided by the corresponding grooves 8a of the guide walls 8. Thus, the first push switch 15 is pushed downward by the operating surface 5a of the operating knob 5 so as to become switched on. When the pushing force on the operating surface 5a is released, the operating knob 5 is lifted upward by a resilient force of a return spring (not shown) contained in the first push switch 15, whereby the first push switch 15 becomes switched off. When the user pushes the key top 9 protruding from the front end of the housing 1, the second push switch 16 is pushed by the key top 9 and becomes switched on. The on/off signals of the first and second push switches 15, 16 are similarly lead outward from the circuit board 3 via the flexible printed board 18.

In a present embodiment, the in-vehicle knob switch device includes a tubular housing 1 (i.e. the casing 6 and the cover 7) having an opening 6*a*. A holder 2 is disposed inside the housing 1. A circuit board 3 is disposed on the holder 2. A first push switch 15 is mounted on the circuit board 3. An operating knob 5 is exposed through the opening 6*a* of the housing 1 and is provided for pushing the first push switch 15.

The housing 1 is provided with the guide walls 8 for guiding the operating knob 5 during a pushing operation. In the in-vehicle knob switch device, the opposite side surfaces of the holder 2 are provided with the cutout-like recesses 2*a* in a section of the holder 2 that faces the opening 6*a*. The plurality of guide walls 8 is integrally provided inside the casing 6 and extends from the opening 6*a* towards the recesses 2*a* of the holder 2. In addition, the plurality of slidable leg segments 5*b* that extend from four corners of the underside of the operating surface 5*a* of the operating knob 5 are slidably engaged to the corresponding grooves 8*a* of the guide walls 8. By allowing the guide walls 8 integrated with the casing 6 to be positioned within the recesses 2*a* of the holder 2, the guide walls 8 can be given a sufficient length so as to extend from the opening 6*a* to the sides of the holder 2. Accordingly, a backlash that may occur in the operating knob 5 during a pushing operation is significantly reduced.

Unlike a case where the operating knob 5 is guided by a separately provided guide member, because the guide walls 8 for the operating knob 5 in this embodiment are integrally provided in the casing 6, which is a component included in the housing 1, a space for setting a separate guide member is not necessary. Accordingly, this contributes to an enhanced flexibility in the design of the in-vehicle knob switch device.

Although the above embodiment is directed to an example of an in-vehicle knob switch device in which the rotatable operating ring 4, the pushable operating knob 5, and the pushable key top 9 are disposed in the housing 1, the present embodiments are also applicable to a type of an in-vehicle knob switch device in which the housing 1 has at least the pushable operating knob 5 disposed therein. Therefore, where necessary, the operating ring 4 and/or the key top 9 may be omitted.

The above embodiment is directed to an example in which, of the casing 6 and the cover 7 constituting the housing 1, the opening 6*a* through which the operating knob 5 is exposed is provided in the casing 6. Alternatively, the operating knob 5 may be exposed through an opening provided in the cover 7, or where necessary, the operating knob 5 may be exposed through openings respectively provided in the casing 6 and the cover 7.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An in-vehicle knob switch device comprising:
    a housing having an opening with guide portions;
    a holder disposed inside the housing having opposite side surfaces provided with cutout-like recesses through which the guide portions extend from the opening, the recesses being provided in a section of the holder that faces the opening and through which the guide portions extend;
    a circuit board supported by the holder;
    a push switch mounted on the circuit board; and
    an operating knob that is exposed through the opening and capable of pushing the push switch, the operating knob having a plurality of slidable portions that protrude into the housing so as to be slidingly engaged by the guide portions.

2. The in-vehicle knob switch device according to claim 1, wherein the slidable portions comprise leg segments disposed at four corners of an undersurface of the operating knob, the leg segments being slidably engaged with grooves provided in the guide portions.

3. The in-vehicle knob switch device according to claim 1, wherein the housing is tubular.

4. An in-vehicle knob switch device comprising:
    a housing having an opening with guide portions;
    a holder disposed inside the housing having opposite side surfaces provided with cutout-like recesses through which the guide portions extend from the opening, the recesses being provided in a section of the holder that faces the opening, and through which the guide portions extend;
    a circuit board supported by the holder;
    a push switch mounted on the circuit board; and
    an operating knob that is exposed through the opening and capable of pushing the push switch, the operating knob having a plurality of slidable portions that protrude into the housing so as to be slidingly engaged by the guide portions; and
    wherein the slidable portions comprise leg segments disposed at four corners of an undersurface of the operating knob, the leg segments being slidably engaged with grooves provided in the guide portions.

5. The in-vehicle knob switch device according to claim 4, wherein the housing is tubular.

\* \* \* \* \*